(12) United States Patent
Clieve

(10) Patent No.: US 8,158,229 B2
(45) Date of Patent: Apr. 17, 2012

(54) AUTOMOTIVE GLAZING

(75) Inventor: Brian Edward Clieve, Burscough (GB)

(73) Assignee: Pilkington Group Limited, St. Helens, Merseyside (GB)

( * ) Notice: Subject to any disclaimer, the term of this patent is extended or adjusted under 35 U.S.C. 154(b) by 496 days.

(21) Appl. No.: 10/450,251

(22) PCT Filed: Dec. 12, 2001

(86) PCT No.: PCT/GB01/05510
§ 371 (c)(1),
(2), (4) Date: Jun. 12, 2003

(87) PCT Pub. No.: WO02/051629
PCT Pub. Date: Jul. 4, 2002

(65) Prior Publication Data
US 2004/0048023 A1    Mar. 11, 2004

(30) Foreign Application Priority Data
Dec. 23, 2000  (GB) .................... 0031603.4

(51) Int. Cl.
*B32B 7/02*   (2006.01)
*B32B 7/06*   (2006.01)
*B32B 7/12*   (2006.01)
*B32B 17/10*  (2006.01)

(52) U.S. Cl. ....... 428/40.1; 428/215; 428/216; 428/336; 428/412; 428/425.6; 428/430; 428/432; 428/442

(58) Field of Classification Search .................. 428/215, 428/334, 336, 337, 412, 425.6, 430, 441, 428/442, 40.1, 216, 432; 296/97.7, 97.1
See application file for complete search history.

(56) References Cited

U.S. PATENT DOCUMENTS

| | | | |
|---|---|---|---|
| 4,232,080 A | | 11/1980 | Orain et al. |
| 4,721,648 A | | 1/1988 | Kleine-Doepke et al. |
| 4,751,145 A | * | 6/1988 | Sebastiano et al. ........ 428/425.6 |
| 4,857,376 A | | 8/1989 | Von Reis et al. |
| 4,891,271 A | * | 1/1990 | Bravet et al. ............... 428/423.1 |
| 4,943,484 A | * | 7/1990 | Goodman .................... 428/441 |
| 4,952,459 A | | 8/1990 | Thatcher |
| 5,002,326 A | | 3/1991 | Westfield et al. |
| 5,554,431 A | | 9/1996 | Bravet et al. |
| 5,645,940 A | | 7/1997 | Teddington, Jr. et al. |
| 5,829,507 A | * | 11/1998 | Pawlowski ................. 160/368.1 |

FOREIGN PATENT DOCUMENTS

CA   2 339 619 A1   2/2000

(Continued)

OTHER PUBLICATIONS

Bravet et al., "Bilayer Glazing: A Concept with Improved Solutions for Tomorrow's Automobiles," *Society of Automotive Engineers*, 1995, pp. 163-172.

(Continued)

*Primary Examiner* — Dhirajlal S. Nakarani
(74) *Attorney, Agent, or Firm* — Buchanan Ingersoll & Rooney PC

(57) ABSTRACT

An automotive glazing (10) comprising a single ply of annealed or semi-toughened glass (12) having a film of plastic material (16) bonded to a major surface of the glass ply by a contact adhesive (14).

15 Claims, 4 Drawing Sheets

FOREIGN PATENT DOCUMENTS

| | | |
|---|---|---|
| DE | 36 15 277 A1 | 11/1986 |
| DE | 35 23 140 C2 | 4/1987 |
| DE | 36 32 472 A1 | 3/1988 |
| EP | 0 673 757 | 9/1995 |
| FR | 1.602.763 | 3/1971 |
| GB | 1 433 532 | 4/1976 |
| GB | 2 339 405 | 1/2000 |
| JP | 2000-96009 A | 4/2000 |
| WO | WO 88/01230 A1 | 2/1988 |
| WO | WO 00/07953 A1 | 2/2000 |

OTHER PUBLICATIONS

Building Materials Industry Information, "Superior Performances and Application of Structural Sandwich Glass", Sep. 1998.

The Institute of Glass and Inorganic Materials of Dalian College of Light Industry, "Glass Surface Decoration Technology", by Wong Cheng-yu and Tao Ying, Published in Glass and Enamel, No. 2, V. 24, Ionic Plating. Published in 1996.

Official Action issued by Chinese Patent Office and English language translation of same, Feb. 24, 2006.

\* cited by examiner

AUTOMOTIVE GLAZING

This invention relates to automotive glazings. More particularly it relates to automotive glazings of novel construction.

Glazings for automotive use conventionally comprise safety glass which may be laminated (widely used for windscreens) or toughened (widely used for sidelights and backlights). Laminated windscreens conventionally comprise two annealed glass plies (i.e. glass which has undergone controlled cooling to remove internal stresses) each of thickness 2.1 mm, bonded at high temperature and pressure (e.g. 145° C. and 10 atmospheres), by a ply of polyvinylbutyral. Toughened glass is formed by subjecting annealed glass to quenching so as to produce permanent stresses in the glass. Toughened glass for automotive use is toughened to the extent that it passes the fragmentation test for uniformly toughened glass panes specified in ECE R43 (the relevant safety standard in Europe for automotive glazings) in which the number of fragments in any 5 cm×5 cm square is not less than 40 or more than 400, or in the case of a glazing not more than 3.5 mm thick, 450.

A technical paper published by the Society of Automotive Engineers in 1995 entitled "Bilayer glazing: A concept with improved solutions for tomorrow's automobiles" discloses an alternative type of glazing for automotive use—a bilayer glazing which is one which comprises a single glass ply bonded to at least one plastic layer. The paper discloses a bilayer glazing suitable for automotive use which comprises a single glass ply, which may be annealed or toughened, bonded to a polyurethane plastic sheet of thickness 0.8-1.0 mm. Such a glazing provides some advantages over conventional safety glass, however it is expensive to manufacture because the polyurethane sheet is bonded to the glass ply using the conventional laminating process (i.e. at high temperature and pressure).

Safety glass and bilayer glazings are known for use in the architectural industry. However, architectural glazings are subject to different safety standards than automotive glazings and are generally not considered acceptable for automotive use.

The manufacturing costs associated with laminated and toughened glass for automotive use and the known type of automotive bilayer glazing is high in terms of the cost of the equipment and the processing cost. Consequently there is a desire to reduce the cost of glazings suitable for automotive use.

We have found that a glazing construction different to conventional safety glass and other known automotive glazings is suitable for automotive use.

According to an aspect of the invention there is provided an automotive glazing comprising a plastic film bonded to a major surface of a single ply of glass in which the glass ply when subjected, before bonding to the plastic film, to the fragmentation test for uniformly toughened glass panes specified in ECE R43 fragments such that the number of fragments in any 5 cm×5 cm square is less than 40, wherein the film of plastic material is bonded to the glass ply by a contact adhesive.

The use of a contact adhesive (one which is applied on at least one of the two surfaces to be bonded; the two surfaces are then brought together and pressure is applied for a short time between them to achieve rapid bonding) to bond the plastic film to the glass avoids the need for the conventional laminating process, thereby reducing manufacturing costs.

It is surprising that such glazings are suitable for automotive use because it was thought that glass which was insufficiently toughened to pass the fragmentation test for uniformly toughened glass panes specified in ECE R43 (ie annealed glass and semi-toughened glass) at the thicknesses of automotive glazings (i.e. up to about 6 mm) would fail the impact tests of ECE R43. It was expected that under these tests the plastic film would tear or be split open by the sharp fragments of broken glass which result when the glazing is subjected to these tests and the glazings would fail the tests. However, we found that whilst the glass broke into sharp fragments, they did not tear or split the plastic film and the glazings passed the tests.

Preferably the plastic film has a thickness of at least 50 microns and may be of mono-layer or multi-layer construction. The plastic film preferably comprises polyethylene terephthalate, but may comprise any one of polyethylene napthalate, polycarbonate, acrylic, polyurethane (including thermoplastic polyurethane) and ionomer resin.

A hard coat (one which is resistant to abrasion and to scratching) may be applied to the exposed side of the plastic film to enhance the durability of the glazing.

The adhesive may have a thickness in the range of 5 to 50 microns and is preferably provided on a surface of the plastic film. The force required to peel the plastic film from the glass may be less than about 33 Newtons/30 mm.

The glass ply may comprise annealed glass or semi-toughened glass. Semi-toughened glass is desirable when the glazing is to be used for opening sidelights in vehicle doors which are required to withstand slamming of the door. The glass will preferably have a thickness of at least 1 mm and most preferably at least 1.5 mm to provide improved resistance to stone chipping.

The glazing may be provided with solar control properties. For example, the glazing may be provided with a layer of infra-red reflecting material deposited on the film or the glass. The glazing may also include a ply which absorbs ultra-violet radiation.

Preferably the glazing comprises a sidelight, a rearlight or a rooflight.

According to a further aspect of the invention there is provided an automotive glazing comprising a plastic film bonded to a major surface of a single ply of glass in which the glass ply when subjected, before bonding to the plastic film, to the fragmentation test for uniformly toughened glass panes specified in ECE R43 fragments such that the number of fragments in any 5 cm×5 cm square is less than 40, wherein the force required to peel the film from the glass is less than 33 Newtons.

Embodiments of the invention will now be described with reference to the accompanying drawings in which.

Figure 1:
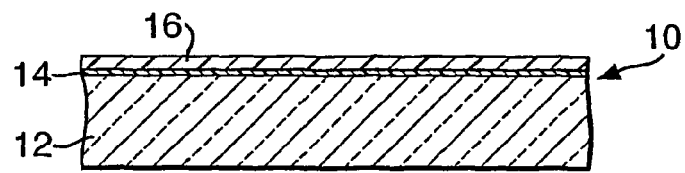
FIG. 1 is a fragmentary cross section of a bilayer glazing in accordance with the invention.

Referring to the drawings, a bilayer glazing generally designated 10 comprises an annealed glass ply 12 having major surfaces 12a and 12b. When a pane of annealed glass is subjected to the fragmentation test for uniformly toughened glass panes specified in ECE R43, the pane fragments and the number of fragments in any 5 cm×5 cm square is less than 40. The annealed glass ply is bonded to a film 16 of polyethylene terephthalate (PET) by an adhesive layer 14 which comprises a contact adhesive. PET films are commonly available from a number of manufacturers as a mono-layer or multi-layer film, and are usually supplied with a thin layer of a contact adhesive, typically 25 µm, provided on one surface thereof, the adhesive being protected by a release liner. In the construction of such a glazing, the release liner is removed from the PET film, and the film is placed above a sheet of glass with the adhesive side of the film facing the glass surface 12a. The film and the glass are then brought together and fed between a pair of rollers which apply pressure between the film and the glass and cause the adhesive to bond the film to the glass.

Samples of a bilayer glazing were constructed as described above with the annealed glass being 2.1 mm thick and the PET film being a 200 µm (thick) bi-layer film available from Courtaulds Performance Films (CP film) which has a layer of adhesive 25 µm thick provided on one surface. A sample measuring 300 mm×300 mm was tested under the ball drop test of ECE R43 and passed the test. Another sample measuring 1100 mm×500 mm was tested under the headform test of ECE R43 and passed that test.

A further set of samples were similarly constructed, except the PET film used was a 200 µm (thick) tri-layer available from 3M which has a layer of adhesive 25 µm thick provided on one surface. A sample measuring 300 mm×300 mm was found to pass the ball drop test of ECE R43, and a sample measuring 1100 mm×500 mm was found to pass the headform test of ECE R43. Other samples measuring 300 mm×300 mm were constructed with this 3M film applied to 3 mm and 4 mm thick annealed glass, and each sample passed the ball drop test of ECE R43.

Another set of samples were constructed using 2.1 mm thick annealed glass, but in these samples the PET was a 150 µm thick mono-layer film available from Madico which has a layer of adhesive 25 µm thick provided on one surface which was wetted with water prior to pressure being applied between the film and the glass. This was done by spraying the glass surface with water and then the film and glass were brought together and a squeegee was used to apply pressure between the film and the glass, and also to remove any air and any excess water from between the film and the glass. A sample of this glazing measuring 300 mm×300 mm was tested under the ball drop test of ECE R43 and was found to pass the test.

The results of these tests are surprising because annealed glass at the thicknesses of most automotive glazings (ie from about 3 mm up to about 6 mm) will break into sharp fragments under both the ball drop and headform tests of ECE R43, and whilst PET has high tensile strength, it has relatively poor tear resistance and so it was expected that under each test the PET film would be torn or split open by the sharp fragments of broken glass which result when the glazing is subjected to these tests. However, this was not the case. In each of the above mentioned examples the glass did break into sharp fragments but they did not tear or split the PET film. It is believed that this is because of a combination of the thickness of the glass and the adhesion level of the PET to the glass. A glass ply of thickness 4 mm or less whilst rigid, is thin enough to flex somewhat when impacted before the ply breaks and hence it absorbs some of the impact energy. Moreover, it is believed that the impact performance of the bilayer glazing will, to a certain extent, be determined by the level of adhesion of the PET to the glass. It is believed that the higher the level of adhesion the more brittle the glazing. A glazing with too high an adhesion level will result in a brittle glazing which will not absorb sufficient impact energy from an impact to the glazing, and hence the PET will be torn or split by the sharp fragments of broken glass of the glass ply which breaks under the ball drop and headform tests of ECE R43. If the adhesion level is too low there may not be sufficient adhesion to bond the PET film to the glass and the film could be easily peeled from the glazing.

Figure 2:
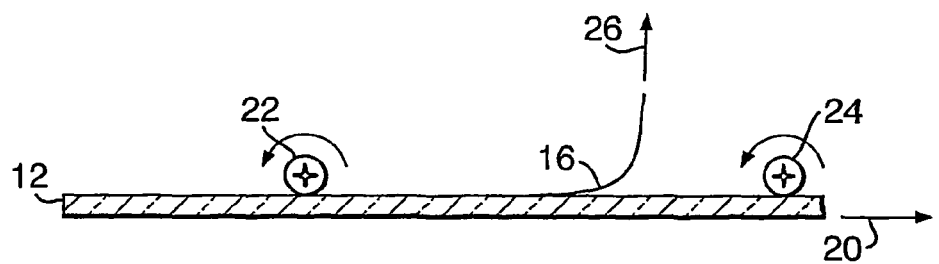
FIG. 2 is a schematic side view of apparatus used to measure the amount of force required to peel the film from a glass sample.
Figure 3:
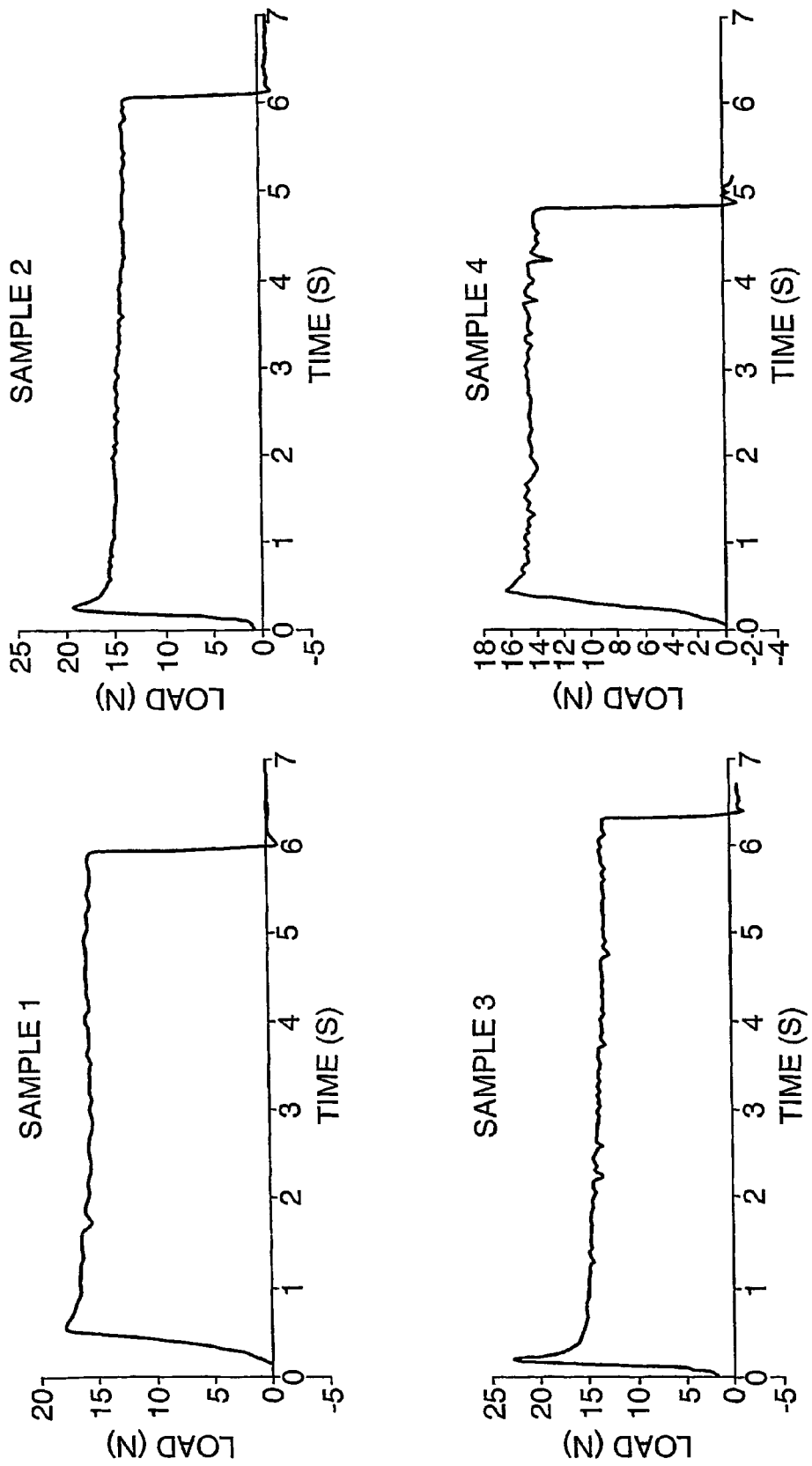
FIGS. 3 and 4 are graphs that show the force required to peel the plastic film from a glass sample.
Figure 3:
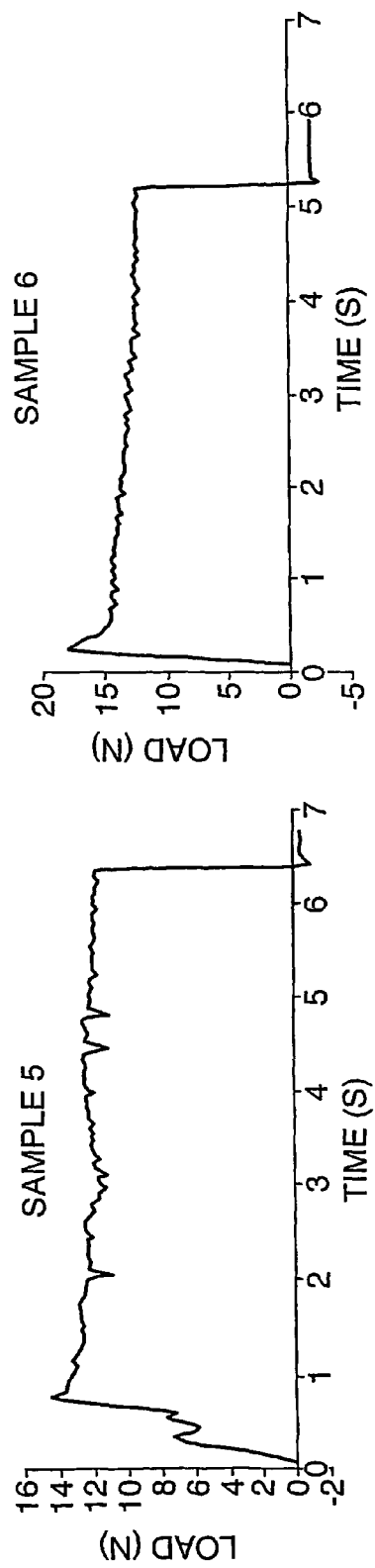
Figure 4:
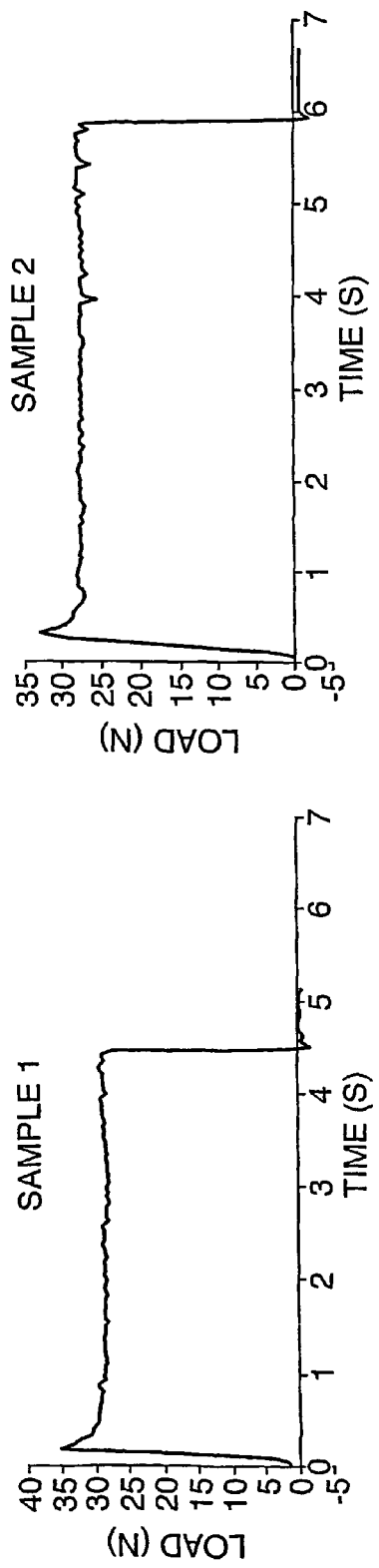
Figure 4:
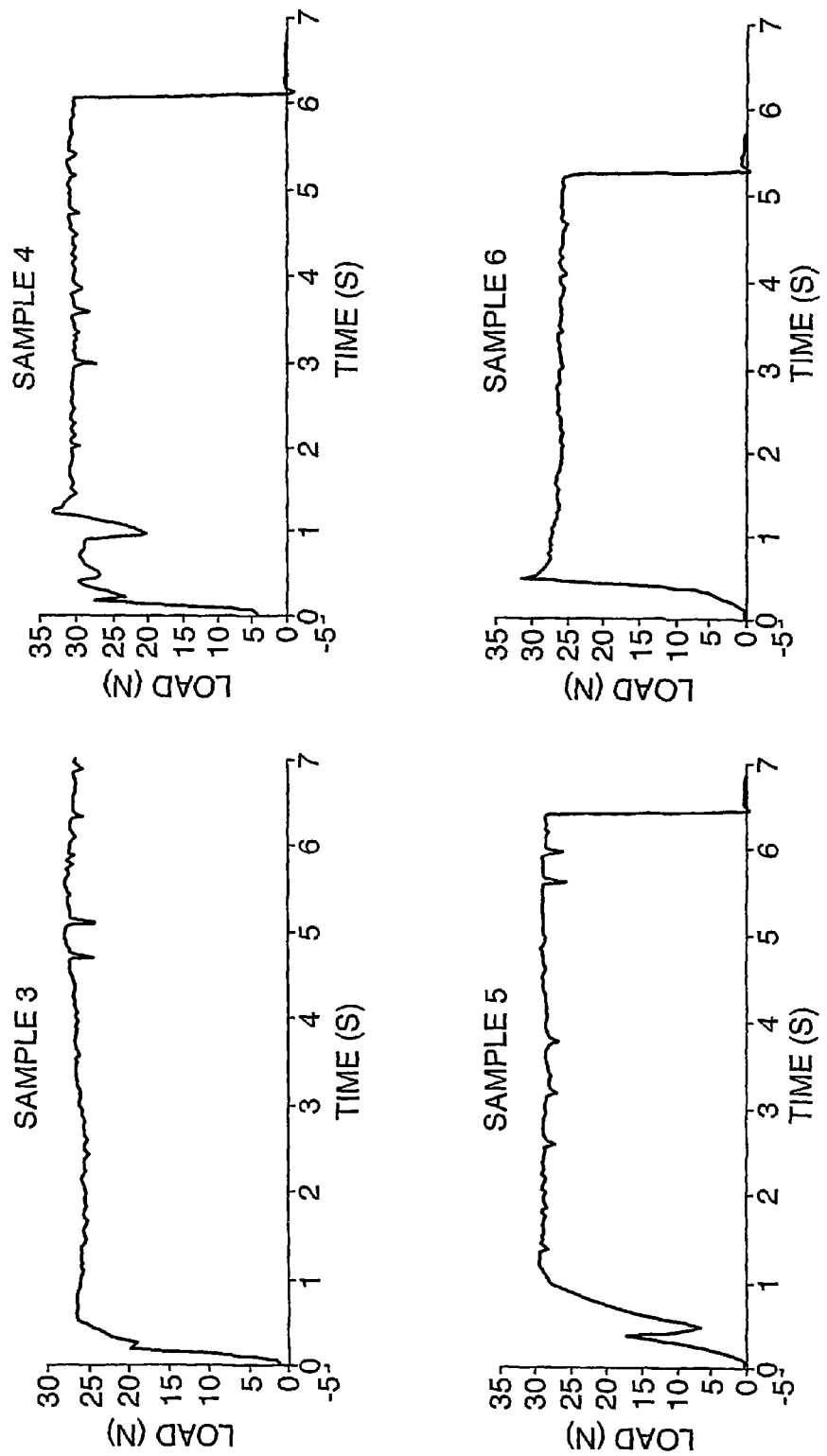

The adhesion level of the PET film to the glass was measured in a number of samples. 4 mm thick glass samples measuring 80 mm×30 mm with a PET film bonded to one side were tested and the adhesion level was measured in terms of the force required to peel the film from the sample. The samples were tested using an Instron 5500R universal testing machine, with the cross-head speed set to 300 mm/min (ie the speed at which the film was pulled from the glass sample). The apparatus is shown schematically in FIG. 2 where a pulling force was applied to the film in the direction of arrow 26, perpendicular to the glass surface. The sample could move in the direction of arrow 20 underneath rollers 22 and 24 to ensure the pulling force was applied at a constant angle in relation to the glass surface. The results are shown graphically in FIGS. 3 and 4. The samples in relation to FIG. 3 had the aforementioned CP film bonded to the glass, and the samples in relation to FIG. 4 had the aforementioned 3M film bonded to the glass. The results show that in general a higher force is required to initiate peeling than is required to continue the peeling. For the CP film the force required to peel the film from the glass is in the range of about 15 to 23 Newtons/30 mm, and for the 3M film it is in the range of about 23 to 33 Newtons/30 mm.

The invention is not limited to annealed glass. It is also applicable to semi-toughened glass which is glass which has been toughened but not to the same degree as toughened glass (ie in the fragmentation test for uniformly toughened glass panes specified in ECE R43, a pane of semi-toughened glass fragments and the resulting number of fragments in any 5 cm×5 cm square is less than 40). At a given thickness, semi-toughened glass exhibits a lower level of toughening stresses than toughened glass. Semi-toughened glass is desirable when the glazing is to be used for opening sidelights in vehicle doors which are required to withstand slamming of the door.

PET films were used in the above examples because of their ready availability from a number of manufacturers. However, it will be appreciated that films comprised of other plastic materials may also be suitable, and these include polyethylene napthalate, polycarbonate, acrylic, polyurethane (including thermoplastic polyurethane such as ISOPLAST available from Dow) and ionomer resin (such as SentryGlas PLUS available from Du Pont). The plastic film may be a monolayer film or a multi-layer film and have a thickness of at least 50 µm.

In the above examples the thickness of the adhesive applied to the PET film is about 25 µm, but it will be appreciated that the adhesive may have a thickness in the range 5 µm to 50 µm. Moreover, an adhesive layer may be applied to the glass surface instead of, or in addition to, the adhesive layer provided on the film. It will also be envisaged that the adhesive layer may be sprayed, flow coated, dip coated or screen printed onto the glass and/or plastic surface. Adhesion may be provided by known polymers which are thermally or UV curable and when using such polymers, the surfaces to be bonded are required to be brought together and have pressure applied between them.

Properties of solar control may be incorporated into the glazing by incorporating an infra-red reflecting layer which may be provided on a surface of the glass or the plastic layer of the glazing, and/or an ultra-violet absorbing species into the glass or one of the plastic layers of the glazing.

Glazings of the present invention may be thinner than currently available automotive glazings (the thinnest automotive toughened glazings currently available are nominally about 3 mm) and so are lighter in weight and have greater design flexibility.

In use the glazing is fitted in a vehicle with the plastic film facing the interior of the vehicle. This has the added advantage in that once the glazing has been fractured, the plastic layer prevents glass splinters and glass spall from entering the interior of the vehicle.

It will be appreciated that a conventional hard coat (resistant to abrasion and to scratching), such as polydimethylsiloxane, may be applied to the exposed surface of the plastic layer to enhance the durability of the glazing.

The invention claimed is:

1. An automotive glazing comprising a single ply of glass possessing a major surface facing an interior of a vehicle in use and having a plastic film bonded to the major surface of the glass ply by a layer of adhesive which bonds the plastic film to the single glass ply, the single glass ply being a single ply of annealed or semi-toughened glass that does not meet the fragmentation test under ECE R43, the layer of adhesive having a thickness in the range of 5 microns to 50 microns and requiring a force to peel the plastic film from the glass ply in the range of about 15 Newtons/30 mm to 33 Newtons/30 mm, wherein the single glass ply with the plastic film bonded to the major surface by the layer of adhesive meets at least one of the ball drop test under ECE R43 and the headform test under ECE R43.

2. A glazing as claimed in claim 1 wherein the film of plastic material has a thickness of at least 50 microns.

3. A glazing as claimed in claim 1 wherein the plastic film comprises a single layer.

4. A glazing as claimed in claim 1 wherein the plastic film comprises a plurality of layers of plastic material.

5. A glazing as claimed in claim 1 wherein the plastic material comprises polyethylene terephthalate.

6. A glazing as claimed in claim 1 wherein the plastic material comprises any one of polyethylene napthalate, polycarbonate, acrylic, polyurethane (including thermoplastic polyurethane) and ionomer resin.

7. A glazing as claimed in claim 1 wherein a hard coat is applied to the exposed side of the plastic film.

8. A glazing as claimed claim 1 wherein the adhesive is provided on a surface of the plastic film.

9. A glazing as claimed in claim 1 wherein the glass ply comprises annealed glass.

10. A glazing as claimed in claim 1 wherein the glass ply comprises semi-toughened glass.

11. A glazing as claimed in claim 1 wherein the glass ply has a thickness of at least 1 mm.

12. A glazing as claimed in claim 1 wherein the glass ply has a thickness of less than about 4 mm.

13. A glazing as claimed in claim 1 having a layer of infra-red reflecting material provided on the film or the glass.

14. A glazing as claimed in claim 1 wherein a ply of the glazing absorbs ultra-violet radiation.

15. A glazing as claimed in claim 1 being a sidelight, rearlight or rooflight.

* * * * *